US011259514B1

(12) United States Patent
Larsson et al.

(10) Patent No.: US 11,259,514 B1
(45) Date of Patent: Mar. 1, 2022

(54) LIGHTED FISHING POLE HOLDER

(71) Applicants: John L Larsson, Orange Beach, AL (US); Clinton Herrin, Robertsdale, AL (US)

(72) Inventors: John L Larsson, Orange Beach, AL (US); Clinton Herrin, Robertsdale, AL (US)

( * ) Notice: Subject to any disclaimer, the term of this patent is extended or adjusted under 35 U.S.C. 154(b) by 0 days.

(21) Appl. No.: 17/164,713

(22) Filed: Feb. 1, 2021

(51) Int. Cl.
*A01K 97/10* (2006.01)
*B63B 45/04* (2006.01)
*F21V 23/04* (2006.01)
*B63B 79/40* (2020.01)
*F21Y 115/10* (2016.01)

(52) U.S. Cl.
CPC .............. *A01K 97/10* (2013.01); *B63B 45/04* (2013.01); *B63B 79/40* (2020.01); *F21V 23/0435* (2013.01); *F21Y 2115/10* (2016.08)

(58) Field of Classification Search
None
See application file for complete search history.

(56) References Cited

U.S. PATENT DOCUMENTS

| 6,474,851 | B1* | 11/2002 | Baley | A01K 97/02 362/477 |
| 10,279,877 | B1* | 5/2019 | Allen | A01K 97/10 |
| 10,701,922 | B1 | 7/2020 | Larsson | |
| 10,709,125 | B2* | 7/2020 | Sarnowski | B63B 17/00 |
| 10,874,237 | B2* | 12/2020 | Huntley | A47B 13/16 |
| 2015/0043209 | A1* | 2/2015 | Nirenberg | F21S 4/24 362/249.06 |
| 2018/0069412 | A1* | 3/2018 | Corley | H02J 50/10 |
| 2018/0334232 | A1* | 11/2018 | Poole | B63B 45/04 |

* cited by examiner

Primary Examiner — Alan B Cariaso
(74) Attorney, Agent, or Firm — Peter Loffler

(57) ABSTRACT

A lighted fishing pole holder has a top mount that is attached to the gunwale in the usual way, the top mount having an upper surface, a lower surface seated on the gunwale and a central opening. The top mount has a fishing pole receiving tube member depending downwardly therefrom. The tube member has a base such that a light element is positioned on the base, either atop or embedded therein, the light elements facing toward the central opening. The light element is connected to the boat's electrical system or to a battery and issues light into the tube member which is directed out through the central opening of the top mount. A remote control can control various operations of the light element.

20 Claims, 5 Drawing Sheets

LIGHTED FISHING POLE HOLDER

BACKGROUND OF THE INVENTION

1. Field of the Invention

The present invention relates to a gunwale mounted fishing pole holder wherein the tube of the fishing pole holder has a series of user-controlled lights that issue a light beam out of the open top of the holder.

2. Background of the Prior Art

Gunwale mounted fishing pole holders are a common site on many recreational and small commercial fishing boats. Such fishing pole holders generally comprise a top mount having a central opening. The top mount sits on the gunwale, either protruding upwardly therefrom, or generally flush mounted with the gunwale, with the mount secured to the gunwale in appropriate fashion, such as via screws. A generally cylindrical tube member depends downwardly from the top mount, down below the gunwale, angled with respect to the top mount, anywhere from zero degrees to about thirty degrees or so. The bottom of the tube member can be partially open or completely closed. The butt end of a fishing pole passes through the central opening of the top mount and is received within the tube member sitting on the bottom thereof. The tube member is sufficiently deep so that should a fish bite on the line of the fishing pole, the fishing pole will not be pulled out of the fishing pole holder in most instances. Such fishing pole holders are typically made from stainless steel, aluminum, ABS plastic or some combination thereof.

These fishing pole holders are very convenient as the fishermen can place fishing poles all around the boat in such holders and tend to other tasks—such as drinking beer— while waiting for one of the fishing poles to register a bite. Although highly functional, such fishing pole holders offer little else to the boat owner or his or her passengers.

SUMMARY OF THE INVENTION

In our U.S. Pat. No. 10,701,922, issued on Jul. 7, 2020, which is incorporated herein by reference in its entirety, we improved the art of fishing pole holders substantially in creating a fishing pole holder that added additional functionality as well as aesthetics to the once ordinary fishing pole holder. The lighted fishing pole holder of the present invention continues to improve the art by augmenting a traditional gunwale mounted fishing pole holder with a lighting system that also enhances both the functionality and the aesthetics of the fishing pole holder, especially at night, so as to entertain the passengers of the fishing vessel as well as act as a fish bite signaling device. The lighted fishing pole holder is of relatively simple design and construction, being produced using standard manufacturing techniques, so that the device is relatively inexpensive to produce, making the device economically attractive to potential consumers for this type of device. Installation of the lighted fishing pole holder is relatively straightforward as is usage of the device.

The lighted fishing pole holder of the present invention is comprised of a top mount having an upper surface, a lower surface, and a central opening, the top mount is attached to a gunwale of a boat in appropriate fashion. A tube member has a base and a sidewall, the sidewall having an outer surface and an inner surface, such that the sidewall of the tube member is attached to the lower surface of the top mount and is aligned with the central opening of the tube member. The tube member extends downwardly below a lower surface of the gunwale at an appropriate angle and is secured to the gunwale in any appropriate fashion. A light element is located at the base within the tube member such that the light element issues light toward the central opening of the top mount. The light element is connected to a source of electrical power for powering the light element. The light element may be an LED light or other appropriate light. A control box is electrically connected to the light element. The control box controls operation of the light element via one or more control signals. A remote control wirelessly communicates with the control box such that the remote control wirelessly sends signals to the control box for controlling the control box. The remote control may be a dedicated remote control or may be a standard handheld electronic device such as a tablet or a smart phone. The inner surface of the tube member is reflective.

BRIEF DESCRIPTION OF THE DRAWINGS

Similar reference numerals refer to similar parts throughout the several views of the drawings.

DESCRIPTION OF THE PREFERRED EMBODIMENT

Figure 1:
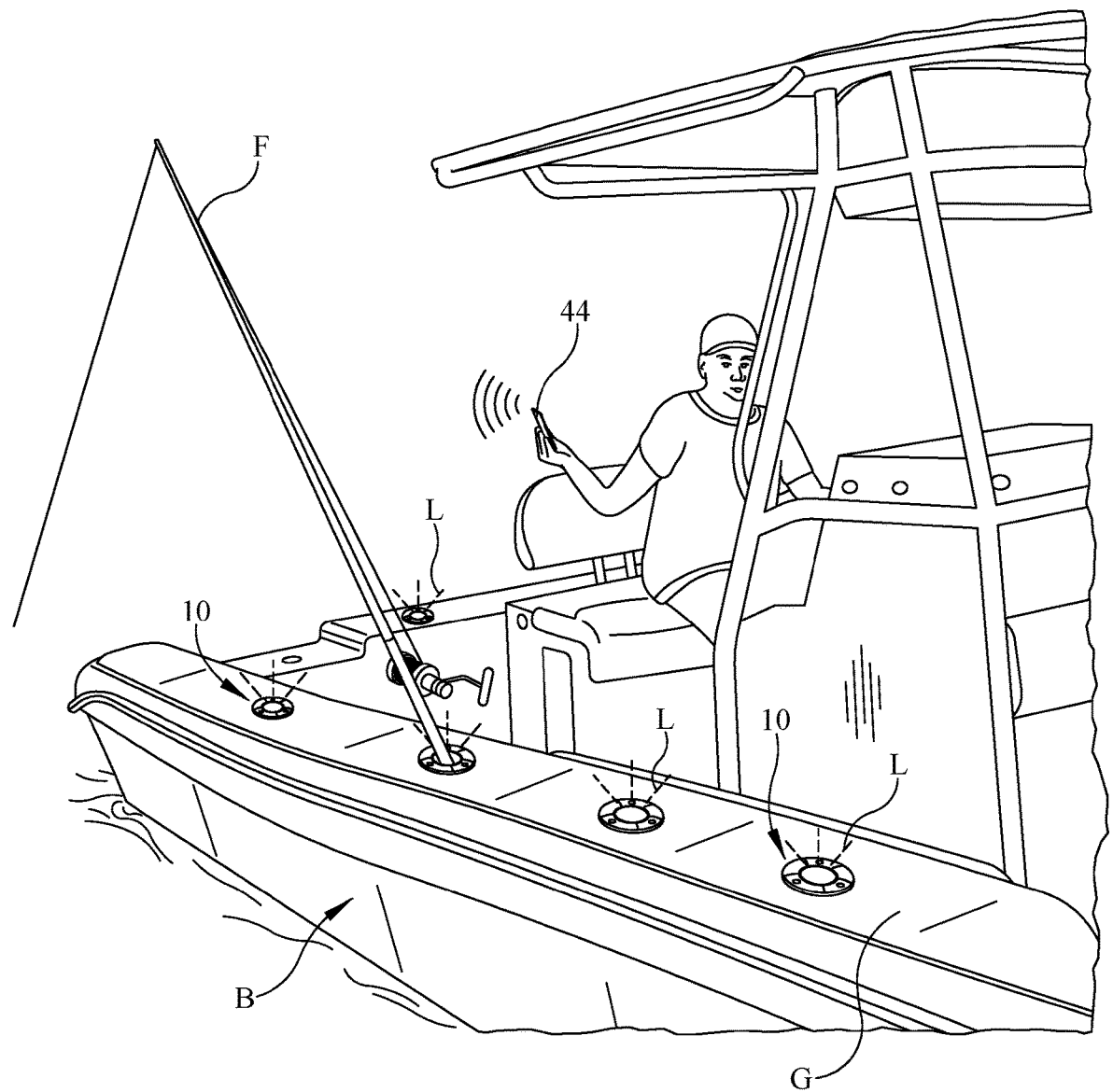
FIG. 1 is an environmental view of the lighted fishing pole holder of the present invention attached to a gunwale of a boat.
Figure 2:
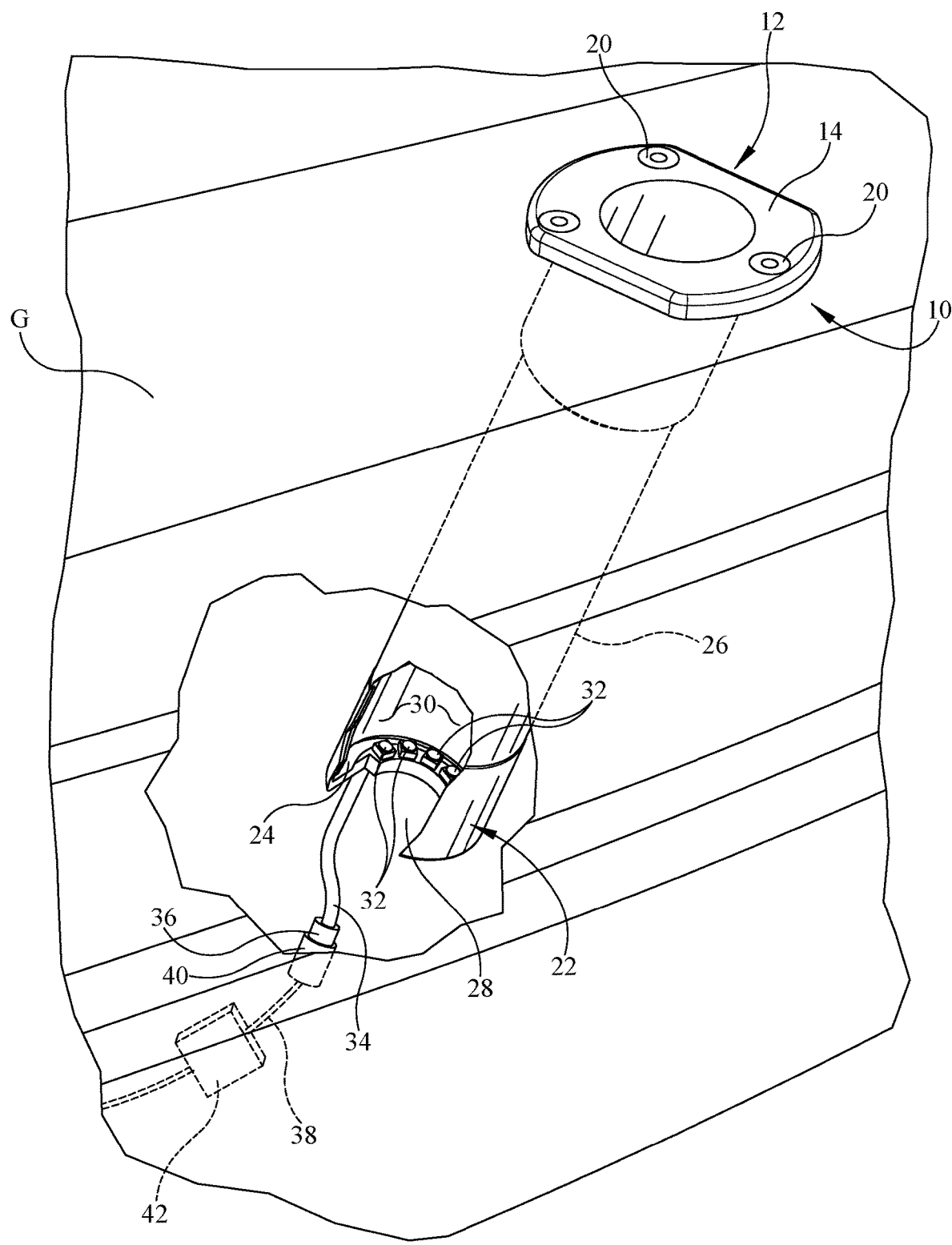
FIG. 2 is a close-up perspective view of the fishing pole holder attached to the gunwale.
Figure 3:
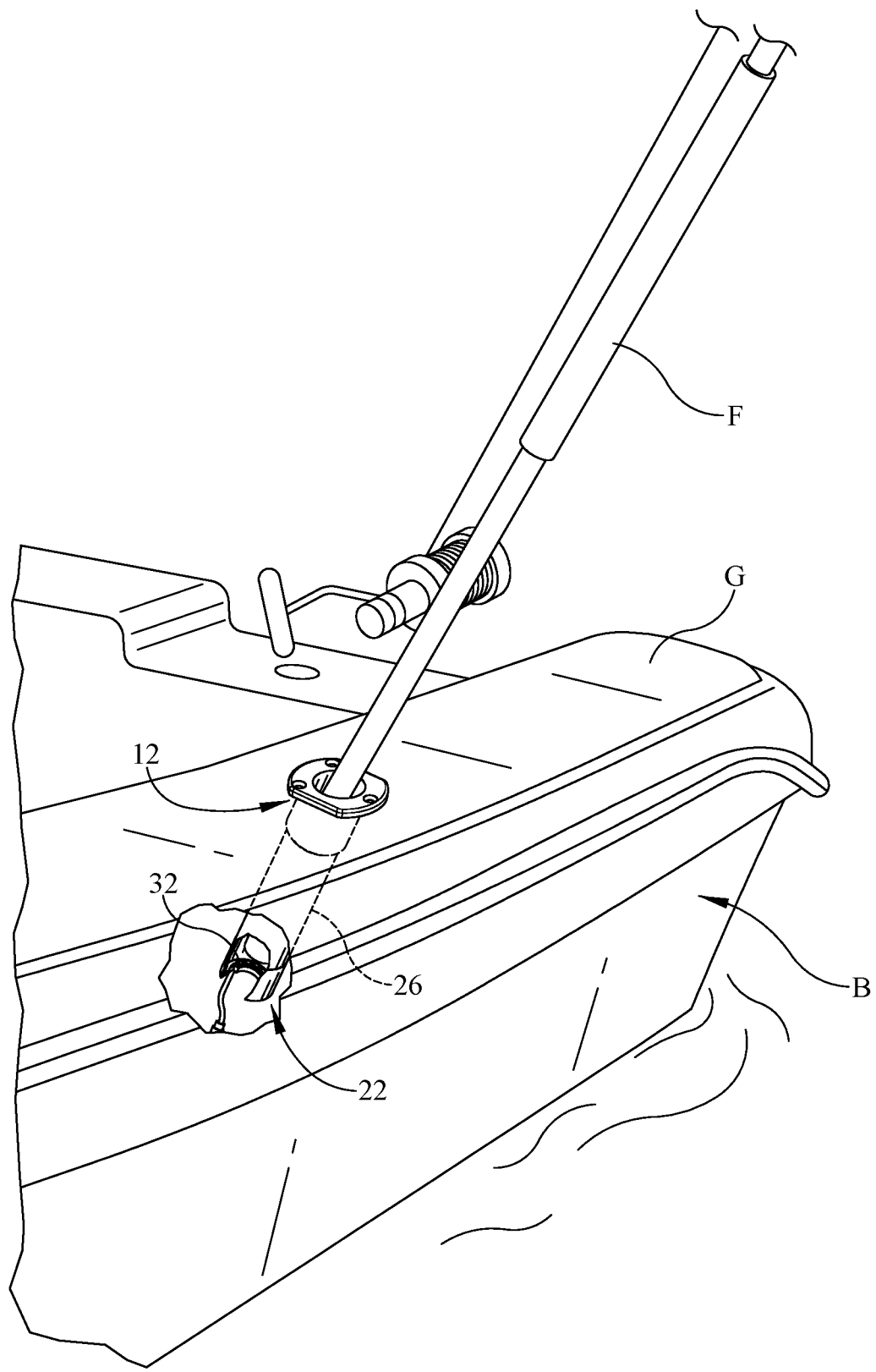
FIG. 3 is a perspective view of the lighted fishing pole holder, attached to a gunwale, having a fishing pole received therein.
Figure 4:
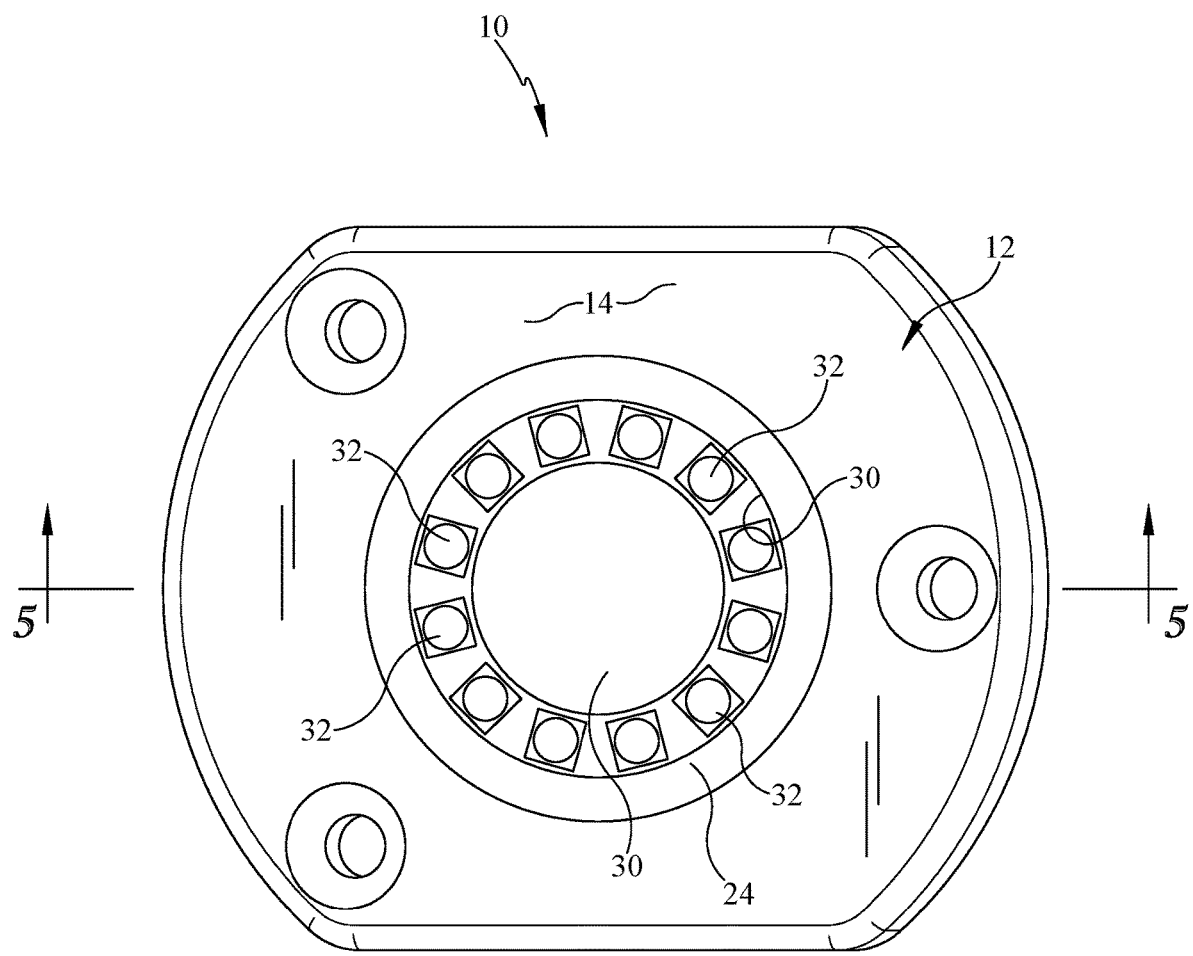
FIG. 4 is a plan view of the fishing pole holder.
Figure 5:
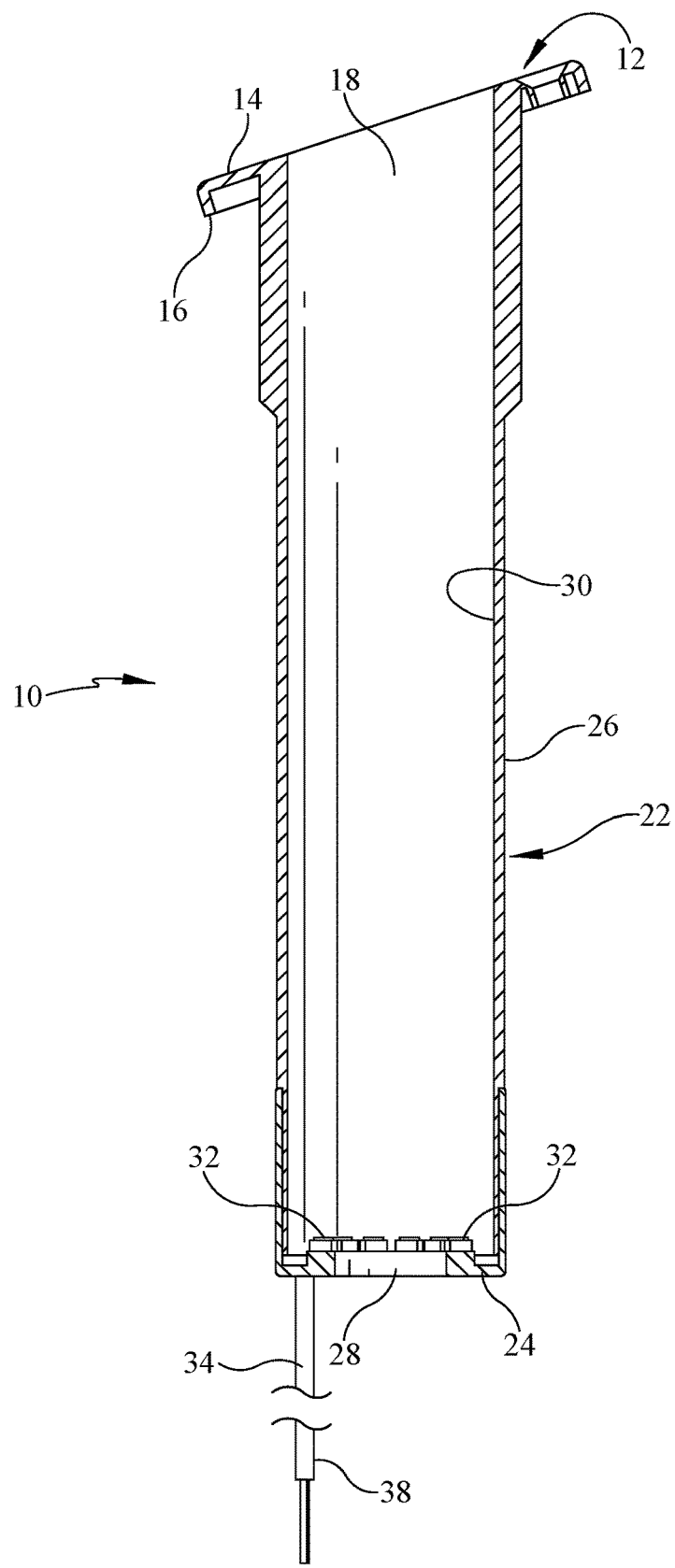
FIG. 5 is a sectioned view of the fishing pole holder taken along line 5-5 in FIG. 4.

Referring now to the drawings, it is seen that the lighted fishing pole holder of the present invention, generally denoted by reference numeral 10, is comprised of a top mount 12 that has an upper surface 14, a lower surface 16, and a central opening 18. The top mount 12 is attached to the gunwale G of a boat B by placing the lower surface 16 of the top mount 12 onto the gunwale G into an appropriate opening in the gunwale G (possibly within a recess (not illustrated) created therein for flush mounting) and is secured to the gunwale G in appropriate fashion such as by passing the illustrated screws 20 through the top mount 12 and into the gunwale G. A generally hollow tube member 22 depends downwardly from the lower surface 16 of the top mount 12, either generally straight down, or, as illustrated, at a desired angle. The tube member 22 is aligned with the central opening 18 of the top mount 12 so that the central opening 18 provides access to the interior of the tube member 22. As seen, the tube member 22 is generally cylindrical in shape and has a base 24 and a sidewall 26 that connects the base 24 with the top mount 12. The base 24 may be closed or may have an opening 28 to allow water to drain from the tube member 22. The top mount and tube member 22 are each made from an appropriate material such as ABS plastic, stainless steel, aluminum, etc., and may be formed as a single unit or as separate units that are attached together in any appropriate fashion. The inner surface 30 of the sidewall 26 of the tube member 22 may be reflective (reflective to mean that the surface is mirrored or quasi-mirrored), either due to the material from which the tube member 22 is made (the tube member is made from stainless steel or aluminum, which may be polished), or a separate reflective material (such as chrome or even an appropriate aluminum foil, etc.) can be attached to the inner surface 30 in appropriate fashion.

One or more light elements 32 are located at the base 24 of the tube member 22, the light elements 32 facing toward the central opening 18 of the top mount 12. The light elements 32 may either be attached to the base 24 in any appropriate fashion or be embedded within the base 24. Advantageously, the light elements 32 are attached or embedded as a single unit such as the illustrated light ring which allows for easy placement of the light elements 32 at the base 24 as well as easy provision of electrical power for the light elements 32. The light elements 32 may be can be any appropriate illumination device, such as LEDs, either single colored or multiple colored.

The light elements 32 are connected to the boat's electrical system in appropriate fashion. As seen, a first electrical cord 34 extends from the lower end of the light elements 32 (again, the light elements 32 are advantageously formed as a single unit which requires a single electrical connection for all light elements 32 at the base 24 of the tube 22) and passes through the opening 28 (or through a dedicated opening on either the base or the sidewall (neither illustrated) if the base is otherwise closed) on the base 24 of the tube member 22). An appropriate first plug 36 is located on the end of the first electrical cord 34. A second electrical cord 38 has one end tied into the electrical system of the boat B (electrical connection not illustrated) and has a second electrical plug 40 on the opposing end—of course the lighted fishing pole holder 10 need not necessarily be connected to the boat's electrical system and can simply be battery operated (battery not illustrated). The first plug 36 and the second plug 40 couple with one another to form an electrical connection. A control box 42 may be located along the length of the second electrical cord 38.

A remote control 44 is also provided.

In order to use the lighted fishing pole holder 10 of the present invention, the fishing pole holder 10 is installed within the gunwale G of the boat B in the usual way. The second electrical cord 38 is electrically connected to the boat's electrical system. The first electrical plug 36 and the second electrical plug 40 are coupled together to form an electrical connection thereby connecting the light elements 32 to the source of electrical power (the boat's electrical system which is typically 12 volts DC). The remote control 44 is used to operate the light elements 32. Such control can be, in the simplest form of the lighted fishing pole holder 10, as simple as turning the light elements 32 on and off. The control box 42 can be more sophisticated so that the light elements 32 can be made to cascade between several units of the lighted fishing pole holder 10, to flash, to act as a light organ (microphone not separately illustrated but located on the control box 42 or other appropriate location), change colors if the light elements 32 come in more than one color including having some of the light elements 32 illuminate in a different color relative to other light elements 32, change intensity, give a preprogrammed light show of appropriate choreography, etc., with appropriate control buttons on the remote control 44 being used for such purposes. If multiple lighted fishing pole holders 10 are installed on the boat B, then each such lighted fishing pole holder 10 can have its own control box 42 or some or all of the lighted fishing pole holders 10 can be controlled from a common control box 42. If more than one control box 42 is used, then a single remote control 44 can be used to control all of the control boxes 42, appropriate addressing capability being resident on the remote control 46, or each control box 42 can be paired with its own remote control 44.

The light L issued by the light elements 32 emanate out of the central opening 18 of the top mount 12. If the inner surface 30 of the tube member 22 is reflective, the light L issued will be more intense.

Of course, the remote control 44 can be dispensed with and simple switch(es) (not illustrated) can be used to control the light elements 32.

The provision of remote control can be accomplished via an appropriate handheld electronic device such as a smart phone, a tablet, etc. If the remote control is a handheld electronic device, the control box has means in order to allow the control box and the handheld electronic device to sync up and communicate The lighted fishing pole holder 10 can be equipped with a strike detector (not illustrated) that detects when a fish strike is registered on the fishing pole F being held within the lighted fishing pole holder 10 wherein such strike detector is coupled to the control box 42 so that when a strike is detected, a signal is sent to the control box 44 so that the control box 42 can control the light elements 32 in appropriate fashion, such as turning the light elements 32 on, or if already on, changing their color, making them flash, increasing their light intensity output, etc., in order to alert a user of the strike on the line.

While the invention has been particularly shown and described with reference to an embodiment thereof, it will be appreciated by those skilled in the art that various changes in form and detail may be made without departing from the spirit and scope of the invention.

We claim:

1. A fishing pole holder comprising:
    a top mount having an upper surface, a lower surface, and a central opening, the top mount adapted to be attached to a gunwale of a boat;
    a tube member having a base and an upwardly directed sidewall terminating at a tube opening, the tube member having an interior space, the sidewall having an outer surface and an inner surface within the interior space, such that the sidewall of the tube member is attached to the lower surface of the top mount such that the tube opening of the tube member is aligned with the central opening of the top mount, the tube member extending downwardly below a lower surface of the gunwale when the top mount is attached to the gunwale; and
    a light element attached directly to the base within the interior space of the tube member such that the light element issues light toward the aligned tube opening of the tube member and the central opening of the top mount, the light element connected to a source of electrical power for powering the light element.

2. The fishing pole holder as in claim 1 wherein the light element is an LED light.

3. The fishing pole holder as in claim 1 further comprising:
    a control box electrically connected to the light element, the control box controlling operation of the light element via one or more control signals; and
    a remote control that wirelessly communicates with the control box such that the remote control wirelessly sends remote signals to the control box for controlling the control box.

4. The fishing pole holder as in claim 3 wherein the remote control is a handheld electronic device.

5. The fishing pole holder as in claim 4 wherein the handheld electronic device is a smart phone.

6. The fishing pole holder as in claim 3 wherein the light element is an LED light.

7. The fishing pole holder as in claim 1 wherein the inner surface of the tube member is reflective.

8. The fishing pole holder as in claim 7 wherein the light element is an LED light.

9. A fishing pole holder comprising:
a top mount having an upper surface, a lower surface, and a central opening, the top mount adapted to be attached to a gunwale of a boat;
a tube member having a base and an upwardly directed sidewall terminating at a tube opening, the tube member having an interior space, the sidewall having an outer surface and an inner surface within the interior space, such that the sidewall of the tube member is attached to the lower surface of the top mount such that the tube opening of the tube member is aligned with the central opening of the top mount, the tube member extending downwardly below a lower surface of the gunwale when the top mount is attached to the gunwale; and
a light element embedded directly within the base within the interior space of the tube member such that the light element issues light toward the aligned tube opening of the tube member and the central opening of the top mount, the light element connected to a source of electrical power for powering the light element.

10. The fishing pole holder as in claim 9 wherein the light element is an LED light.

11. The fishing pole holder as in claim 9 further comprising:
a control box electrically connected to the light element, the control box controlling operation of the light element via one or more control signals; and
a remote control that wirelessly communicates with the control box such that the remote control wirelessly sends remote signals to the control box for controlling the control box.

12. The fishing pole holder as in claim 11 wherein the remote control is a handheld electronic device.

13. The fishing pole holder as in claim 12 wherein the handheld electronic device is a smart phone.

14. The fishing pole holder as in claim 11 wherein the light element is an LED light.

15. The fishing pole holder as in claim 9 wherein the inner surface of the tube member is reflective.

16. The fishing pole holder as in claim 15 wherein the light element is an LED light.

17. A fishing pole holder comprising:
a top mount having an upper surface, a lower surface, and a central opening, the top mount adapted to be attached to a gunwale of a boat, the top mount lying on a plane;
a tube member having a base and an upwardly directed sidewall terminating at a tube opening, the tube member having an interior space, the sidewall having an outer surface and an inner surface within the interior space, such that the sidewall of the tube member is attached to the lower surface of the top mount such that the tube opening of the tube member is aligned with the central opening of the top mount, the tube member extending downwardly below a lower surface of the gunwale when the top mount is attached to the gunwale and such that a central longitudinal axis passes through the tube member, the longitudinal axis being non-perpendicular with respect to the plane; and
a light element located at the base within the interior space of the tube member such that the light element issues light toward the aligned tube opening of the tube member and the central opening of the top mount, the light element connected to a source of electrical power for powering the light element.

18. The fishing pole holder as in claim 17 further comprising:
a control box electrically connected to the light element, the control box controlling operation of the light element via one or more control signals; and
a remote control that wirelessly communicates with the control box such that the remote control wirelessly sends remote signals to the control box for controlling the control box.

19. The fishing pole holder as in claim 17 wherein the inner surface of the tube member is reflective.

20. The fishing pole holder as in claim 17 wherein the light element is an LED light.

* * * * *